United States Patent
Bischoff et al.

(10) Patent No.: US 7,443,124 B2
(45) Date of Patent: Oct. 28, 2008

(54) METHOD AND DEVICE FOR OPERATING A MACHINE, SUCH AS A MULTIAXIAL INDUSTRIAL ROBOT

(75) Inventors: Rainer Bischoff, Augsburg (DE); Jens Bunsendal, Augsburg (DE); Gerhard Hietmann, Herbertshofen (DE)

(73) Assignee: KUKA Roboter GmbH, Augsburg (DE)

( * ) Notice: Subject to any disclaimer, the term of this patent is extended or adjusted under 35 U.S.C. 154(b) by 0 days.

(21) Appl. No.: 11/135,124

(22) Filed: May 23, 2005

(65) Prior Publication Data

US 2005/0264251 A1    Dec. 1, 2005

(30) Foreign Application Priority Data

May 28, 2004   (DE)   ........ 10 2004 026 185

(51) Int. Cl.
  *B25J 9/10* (2006.01)
(52) U.S. Cl. .............................. 318/568.17
(58) Field of Classification Search ........... 318/568.13
  See application file for complete search history.

(56) References Cited

U.S. PATENT DOCUMENTS

| | | | | |
|---|---|---|---|---|
| 2,816,974 A * | 12/1957 | Gibson et al. | ............ | 335/28 |
| 4,150,326 A * | 4/1979 | Engelberger et al. | ........ | 318/563 |
| 4,475,160 A * | 10/1984 | Inaba | ............... | 318/568.16 |
| 4,490,660 A * | 12/1984 | Tsuchihashi | ............... | 700/255 |
| 4,542,471 A * | 9/1985 | Inaba et al. | ............... | 700/256 |
| 4,740,855 A * | 4/1988 | Diepers et al. | ........ | 360/125.03 |
| 4,973,895 A * | 11/1990 | Torii et al. | ............... | 318/567 |
| 4,985,668 A * | 1/1991 | Nakazumi et al. | ........ | 318/568.2 |
| 5,075,870 A * | 12/1991 | Kojyo et al. | ............... | 700/254 |
| 5,119,006 A * | 6/1992 | Torii et al. | ............... | 318/640 |
| 5,214,595 A * | 5/1993 | Ozawa et al. | ............... | 702/58 |
| 5,221,884 A * | 6/1993 | Teshima | ............... | 318/569 |
| 5,400,638 A * | 3/1995 | Kim | ............... | 73/1.79 |
| 5,715,388 A * | 2/1998 | Tsuchihashi | ............... | 714/46 |
| 5,834,916 A * | 11/1998 | Shimogama et al. | ... | 318/568.13 |
| 5,880,956 A * | 3/1999 | Graf | ............... | 700/86 |
| 5,959,425 A * | 9/1999 | Bieman et al. | ........ | 318/568.15 |
| 5,987,591 A * | 11/1999 | Jyumonji | ............... | 700/259 |
| 6,040,554 A * | 3/2000 | Terada et al. | ........... | 219/124.34 |
| 6,070,109 A * | 5/2000 | McGee et al. | ............... | 700/259 |
| 6,157,155 A * | 12/2000 | Kobayashi | ............... | 318/568.22 |
| 6,167,328 A * | 12/2000 | Takaoka et al. | ............... | 700/264 |
| 6,205,839 B1 * | 3/2001 | Brogårdh et al. | ............... | 73/1.79 |

(Continued)

FOREIGN PATENT DOCUMENTS

DE    28 40 341    4/1979

(Continued)

*Primary Examiner*—Lincoln Donovan
*Assistant Examiner*—Robert W Horn
(74) *Attorney, Agent, or Firm*—McGlew & Tuttle, P.C.

(57) ABSTRACT

In order to improve the safety of a machine, particularly a robot, such as a multiaxial or multiaxle industrial robot during the operation thereof, particularly in the presence of human beings, the invention provides a method for operating the machine, which is characterized in that at least one path section is traversed in monitored manner in a reference trip, that movement-characteristic operating values are continuously measured and stored as reference values and that during machine operation said operating values are also determined and compared with the stored reference values. The invention also relates to a device for performing the method.

25 Claims, 2 Drawing Sheets

U.S. PATENT DOCUMENTS

| | | | |
|---|---|---|---|
| 6,208,105 B1* | 3/2001 | Kato et al. | 318/568.24 |
| 6,345,213 B1* | 2/2002 | Graeser et al. | 700/245 |
| 6,349,245 B1* | 2/2002 | Finlay | 700/245 |
| 6,356,807 B1* | 3/2002 | McGee et al. | 700/253 |
| 6,377,869 B1* | 4/2002 | Watanabe et al. | 700/245 |
| 6,414,711 B2* | 7/2002 | Arimatsu et al. | 348/86 |
| 6,429,617 B1* | 8/2002 | Sano et al. | 318/560 |
| 6,430,472 B1* | 8/2002 | Boillot et al. | 700/245 |
| 6,453,213 B1* | 9/2002 | Hong | 700/245 |
| 6,463,358 B1* | 10/2002 | Watanabe et al. | 700/253 |
| 6,477,445 B1* | 11/2002 | Ramstrom et al. | 700/245 |
| 6,480,760 B1* | 11/2002 | Doi | 700/245 |
| 6,490,538 B1* | 12/2002 | Glombitzs et al. | 702/123 |
| 6,507,760 B1* | 1/2003 | Baumgartner | 700/2 |
| 6,643,563 B2* | 11/2003 | Hosek et al. | 700/245 |
| 6,757,626 B2* | 6/2004 | Dougherty et al. | 702/58 |
| 6,763,284 B2* | 7/2004 | Watanabe et al. | 700/264 |
| 6,804,580 B1* | 10/2004 | Stoddard et al. | 700/248 |
| 6,812,665 B2* | 11/2004 | Gan et al. | 318/568.11 |
| 6,816,755 B2* | 11/2004 | Habibi et al. | 700/259 |
| 6,822,412 B1* | 11/2004 | Gan et al. | 318/568.19 |
| 6,836,702 B1* | 12/2004 | Brogårdh et al. | 700/245 |
| 6,845,295 B2* | 1/2005 | Cheng et al. | 700/245 |
| 6,856,863 B1* | 2/2005 | Sundar | 700/254 |
| 6,871,115 B2* | 3/2005 | Huang et al. | 700/245 |
| 6,895,306 B2* | 5/2005 | Ebisawa et al. | 700/245 |
| 6,941,191 B2* | 9/2005 | Jaeger | 700/245 |
| 6,965,209 B2* | 11/2005 | Jones et al. | 318/567 |
| 7,042,187 B2* | 5/2006 | Nagai et al. | 318/609 |
| 7,053,579 B2* | 5/2006 | Moridaira | 318/568.12 |
| RE39,907 E* | 11/2007 | Hong | 318/571 |
| 2002/0029115 A1 | 3/2002 | Moriuchi | |
| 2005/0137751 A1* | 6/2005 | Cox et al. | 700/245 |
| 2005/0149231 A1* | 7/2005 | Pretlove et al. | 700/264 |

FOREIGN PATENT DOCUMENTS

| | | |
|---|---|---|
| DE | 39 24 537 | 2/1991 |
| DE | 39 24 537 C2 | 2/1991 |
| DE | 3924537 * | 2/1991 |
| EP | 0 062 657 | 10/1982 |
| EP | 0 365 681 | 5/1990 |
| EP | 0 365 681 B1 | 5/1990 |
| EP | 0 370 906 | 5/1990 |
| EP | 1 186 975 | 3/2002 |
| GB | 2 355 547 | 4/2001 |

* cited by examiner

METHOD AND DEVICE FOR OPERATING A MACHINE, SUCH AS A MULTIAXIAL INDUSTRIAL ROBOT

FIELD OF THE INVENTION

The invention relates to a method and a device for operating a machine, such as a robot, particularly a multiaxial or multiaxle industrial robot.

BACKGROUND OF THE INVENTION

Robots are being increasingly used in conjunction with human beings, e.g. in combined research projects, in the medical sector and in the entertainment field, in which robots are provided with means for receiving people in order to move them around in the air. In all these cases increased robot operational safety is required.

Numerous methods and devices are known for monitoring a robot. However, what is problematical in the known methods is that it is not possible to detect certain faults and errors based on physical changes to the robot system. These changes are e.g. caused by ageing phenomena, the bending or breaking of structural elements, transmissions or drive shafts. It is also not possible for the measurement system of the robot to detect whether the tools or passenger gondolas flanged to the robot are still correctly connected to the latter.

It is also problematical that a robot system cannot readily detect whether changes have been made to a program section in an unauthorized or negligent manner. Safety-critical installations must be stopped if a software change has not been accepted by a competent employee of a test laboratory, i.e. in particular if such changes have been made in an unauthorized manner. An operating file level-based protection is not adequate, because in certain circumstances it is easy for employees to get round this protection.

Path planning errors which can occur during operation can also not be detected with existing methods. Generally only the position determination is redundantly designed, but this does not apply to the path planning. A machine or robot system which only reliably monitors the adjacent positions can consequently not know whether the adjacent positions have been correctly planned by the control system.

Thus, it must be safely possible to put into operation (again) installations comprising several robots and starting from a randomly assumed stop state. A random, not program-controlled installation state can e.g. be caused by an emergency stop or a power failure. As it cannot be excluded that persons can be endangered in a random installation state, particularly when this state is maintained for a long time, special measures must be taken in order to as quickly as possible eliminate this undesired installation state. It is known to prevent a power failure by interruption-free power supplies.

The problem of the invention is to increase the safety of the movable elements of a machine, particularly a robot, such as an industrial robot.

SUMMARY OF THE INVENTION

In the case of a method of the aforementioned type, the invention solves the set problem in that at least one path section is traversed in monitored manner in a reference travel or trip, that movement-characteristic operating values are continuously measured and stored as reference values and that during machine operation operating values are also determined and compared with the stored reference values. For solving the set problem a device according to the invention is provided with sensors for determining movement-characteristic operating values of movable parts of the machine, particularly the industrial robot, using a device for performing a monitored reference trip accompanied by the measurement of movement-characteristic reference values, with a storage means for storing the reference values measured during the reference trip and with a comparator unit for comparing the movement-characteristic operating values determined during machine operation with correspondingly stored reference values.

Movement-characteristic reference and operating values are those which characterize the movement, a movement of a point or body through the locations is determined at the corresponding, specific instants and the actual instants themselves and through these values are also given the speed between two locations and optionally accelerations which occur, in each case on the basis of quantity and direction.

Thus, as a result of the invention, the movement contour and movement sequence on a machine, such as a robot, or a flanged tool can be reliably monitored. Safety relates to undesired physical changes to the robot system, such as faults to the sensor means, actuator means or structural elements (e.g. cable breaks of sensors, bending or breaking of structural elements, transmission or drive shafts) and undesired interventions in a robot program, such as through the manipulation of data and programs, but also software errors (e.g. path planning errors occurring during operation) or other errors and faults which influence movement implementation. The inventive solution can be implemented in a simple, inexpensive manner and is suitable in the case of the different working conditions of a robot mentioned hereinbefore and in particular when the path to be covered is only rarely changed and no precision in the submillimetre range is necessary.

The invention more particularly makes it possible to use robots in areas where this was not hitherto possible for safety and cost reasons.

The relevant reference values are recorded during a reference trip. The recording of the reference values can take place under normal operating conditions. The reference values can be smoothed by suitable filters. It is also possible to average or compare values over several reference trips in order to detect and exclude random or arbitrary events during the reference trips. It is also possible to record different reference trips as a function of specific program parameters (e.g. program variables) or environmental parameters (e.g. temperature, weight and inertial tensor of a flanged tool). The thus parametrized reference trips are stored on the particular robot control or on an external control and are then available during operation for comparison with current values. It is also possible to mark specific movement points, so that at said points e.g. no or a specific comparison and monitoring strategy is implemented. This is e.g. necessary if the process to be implemented by the robot requires a contact of the robot tool with a component (such as e.g. in the case of spot welding where the welding tongs have contact with a sheet metal part or a car body). In such cases the situation can be such that the reference signals do not supply reproducible and therefore monitorable information.

In order to be able to perform appropriate actions or manipulations on detecting variations between the reference and operating values, according to a preferred development of the invention when such variations are detected between the reference and operating values the machine is stopped.

Preferably in the case of a difference between the operating path or operating values and a reference path or the reference values thereof the comparison between the operating and reference values takes place by the formation of a difference or in that the comparison between the operating and reference values takes place by determining correlations, so that the similarity of the recorded measured value courses with stored reference value courses can be established. The parametrization of the characteristic space during the measurement can be utilized during the comparison in order to cancel out the influence of temperature or weight differences.

According to a preferred development, the comparison between the reference and operating values takes place whilst taking account of tolerances. Preferably the reference path or its values are provided with a tolerance band or range and it is established whether the operating path or operating values fall within said tolerance range.

If the origin of the machine, such as e.g. a robot base is itself moving, e.g. on a path guided by rails, then according to the invention during a movement of a robot base in space during the determination of the operating values account is taken of the path movement of said robot base. Thus, machines or robots with a movable base are rendered safe. Taking account of the base movement e.g. occurs in that the acceleration values thereof are separately measured and subtracted from those of the machine or robot parts, such as robot arms, before the values of the current movement are compared with the reference values.

In order to be able to perform the first starting of the machine or robot, e.g. at the beginning of a new operating day or at the beginning of passenger transport in an automatic and safely monitored manner, according to the invention there is firstly an advance to a reference position in space. It must be ensured that there is in fact an advance to the reference position in space e.g. through a switch, light barriers and similar absolute position-monitoring devices. This ensures that during recording and comparison of place-relative measured quantities (e.g. acceleration values) at least once there is an advance to an absolute, known position and consequently it is possible to reliably detect a misalignment e.g. caused by bent structural elements.

According to a preferred development of the invention said reference position is in a fixed relationship to the robot, e.g. on the robot foot. This ensures that there can always be an advance to the reference point, even if the robot happens to be mounted on a movable base.

According to a preferred development, as soon as the robot has reached the reference position, a special test movement is performed, which can end again at the reference position. During said test movement a reference recorded beforehand at the same test movement is compared with the now measured operating values. The test movement can be used in order to determine as accurately as possible specific operating parameters (e.g. load parameters), so as to be able to use them for parametrizing the measured values during operation. Only when this test movement has taken place successfully, is there a start to the actual operation, which is also monitored in the sense of the invention. The program to be performed can be started automatically.

In a preferred development of the invention a controlled comparison run is carried out. The movable parts of the machine or in particular the robot can be manually controlled or brought in system-controlled manner onto the more correct path. This is optionally followed by the above-described test run or a monitored continuation of the program implementation. Only when the inventive safety logic has established that the robot is again moving in the sense of the recorded reference path, is it possible to change to the automatic mode. This change preferably takes place in interruption-free manner, so that monitoring does not start again due to the operating mode change. It is preferably indicated to the operator that there can again be a change to automatic operation by using a signal, such as an optical or acoustic signal. The actual operating mode change preferably takes place as a result of a user action.

For determining the reference and operating measured values use can be made of both robot-internal and robot-external sensors, as well as robot-internal and robot-external computing units. It is fundamentally possible to determine and compare a physical measured value. However, preferably different and in particular mutually supplementing measured quantities are determined and compared. In a preferred development characteristic kinetic quantities of the machine, particularly the robot, can be determined by position encoders, laser triangulation, laser trackers, 3D image processing and/or inertial sensors. Acceleration sensors and gyroscopes can e.g. be fitted to a tool or to a gondola at the robot flange.

Laser triangulation, also known as Hall GPS, laser trackers or 3D image processing operate with active or passive marks applied to the robot and follow the same, so that conclusions can be drawn about measured quantities such as the Cartesian position, speed and acceleration of the corresponding robot and machine elements.

According to the invention, from measured values and knowledge about kinematic transformations, different measured values are processed in such a way that they can be compared with other measured values. For example, speeds can be calculated by differentiation from actual position values. From the actual position values of the axles, by transformation it is possible to draw conclusions about the Cartesian position of the flange and through the double differentiation thereof about its acceleration.

Even if in principle one of the indicated measured values would be sufficient for detecting faulty installation or equipment behaviour, use can be made of redundant sensors. It is also advantageous to use different types of sensors (different measuring principles) and thereby ensure a redundancy.

Similar information concerning changes to the movement contour and the machine structure (e.g. structure break, bent tool) can also be obtained when using e.g. currents as the reference and comparison quantity. The current necessary for moving a machine is defined by all dynamics-influencing quantities, such as axle positions, speeds, accelerations, masses, centres of gravity and inertias of the moved machine parts and attached tools, gravitational, centrifugal and Coriolis forces and the like. Thus, a meaningful monitoring quantity is provided by the measured axis currents or flows of a machine, such as external sensor signals. If a robot is freely movable in space, according to the invention said movement is detected and monitored independently of the robot movement.

Another important element of the invention is the reference trip, which can e.g. take place in test operation with a depressed consent key and in which the relevant measured values are recorded.

BRIEF DESCRIPTION OF THE DRAWINGS

Further advantages and features of the invention can be gathered from the claims and the following exemplified description of the invention relative to the attached drawings, wherein show:

DETAILED DESCRIPTION OF THE DRAWINGS

Figure 1:
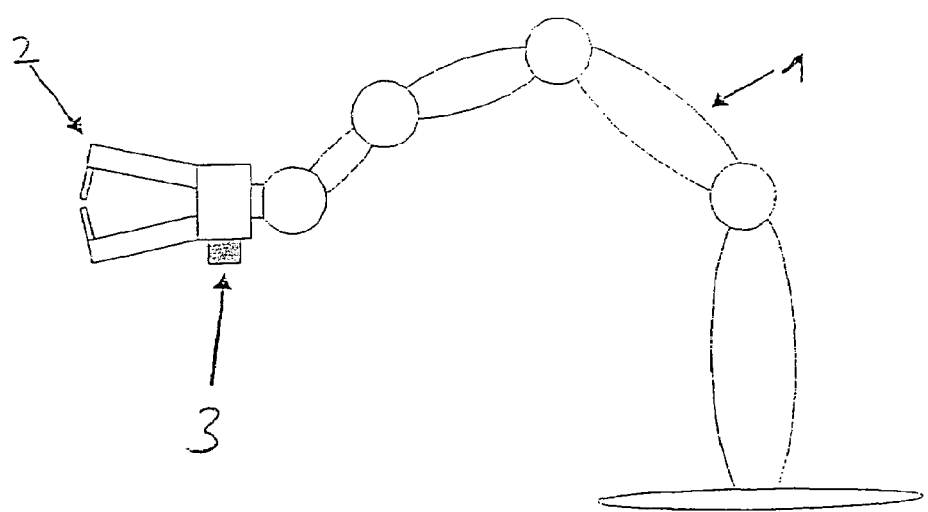
FIG. 1 A robot with a tool and external sensor.

FIG. 1 shows a robot 1 with a flanged tool 2. In place of a tool in the actual sense, this could also be a passenger gondola, such as a known travel or amusement means based on a robot. An external sensor 3 (e.g. an inertial sensor) is fitted at a random point and with random orientation to the tool 2. It supplies movement-characteristic measured values both during a reference trip and during operation. It is also possible to fit inertial sensors to all the structural elements of the robot in order to be able to monitor the values of the robot-internal position encoders with another (inertial) measurement principle. It is also possible for internal current or moment measuring means to provide meaningful signals for the monitoring of the path curve of the robot or flanged tools.

Figure 2:
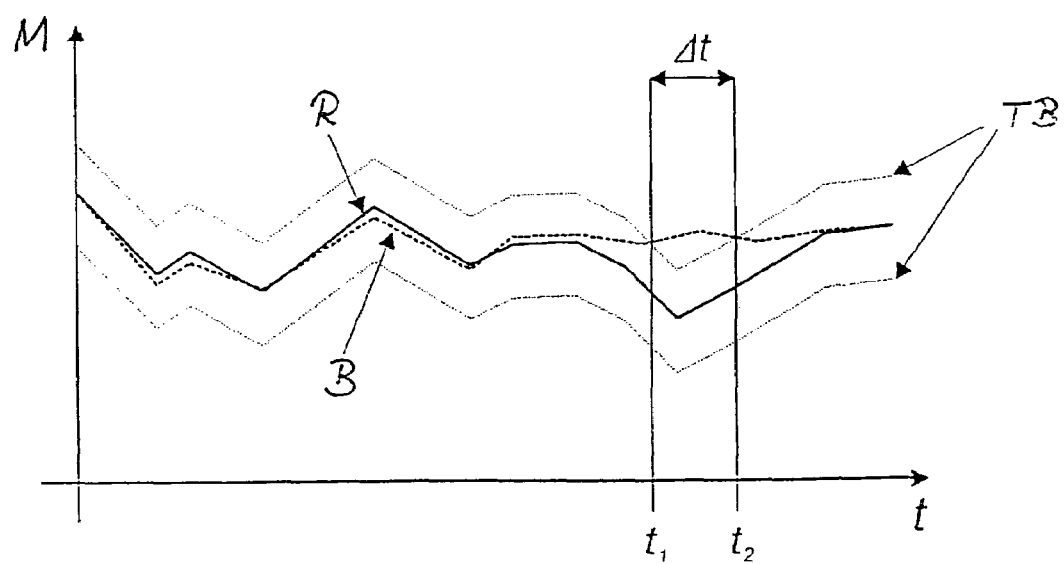
FIG. 2 A comparison of operating and reference curve of a characteristic measured quantity.

FIG. 2 plots the value of a characteristic measured quantity M over time t (reference curve R=continuous line) and above which is located the operating curve B (broken line). It diverges from the reference curve R and breaks through a still acceptable tolerance range TB at time $t_1$ and returns at time $t_2$ within the tolerance range limits. As a function of the nature of the measured value it is possible to define different tolerance ranges TB and it is also possible to establish time differences $\Delta t$ within which it is still possible to accept an exceeding of the tolerance range TB. The robot is stopped if the operating curve B is outside the tolerance range TB for longer than the maximum permitted time $\Delta t > t_{max}$. At $t_{max}=0$ the robot would be stopped at time $t_1$.

Figure 3:
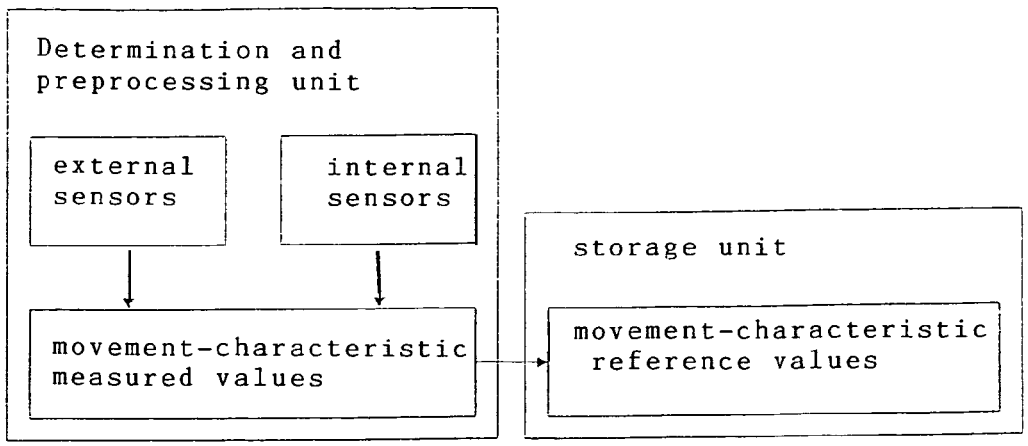
FIG. 3 A block diagram for recording movement-characteristic reference values.

FIG. 3 shows a block diagram for recording movement-characteristic reference values by means of external and internal sensors. The measured values are preprocessed by filtering and averaging over several reference trips or transformations of the measured quantities of movement-characteristic measured values.

Figure 4:
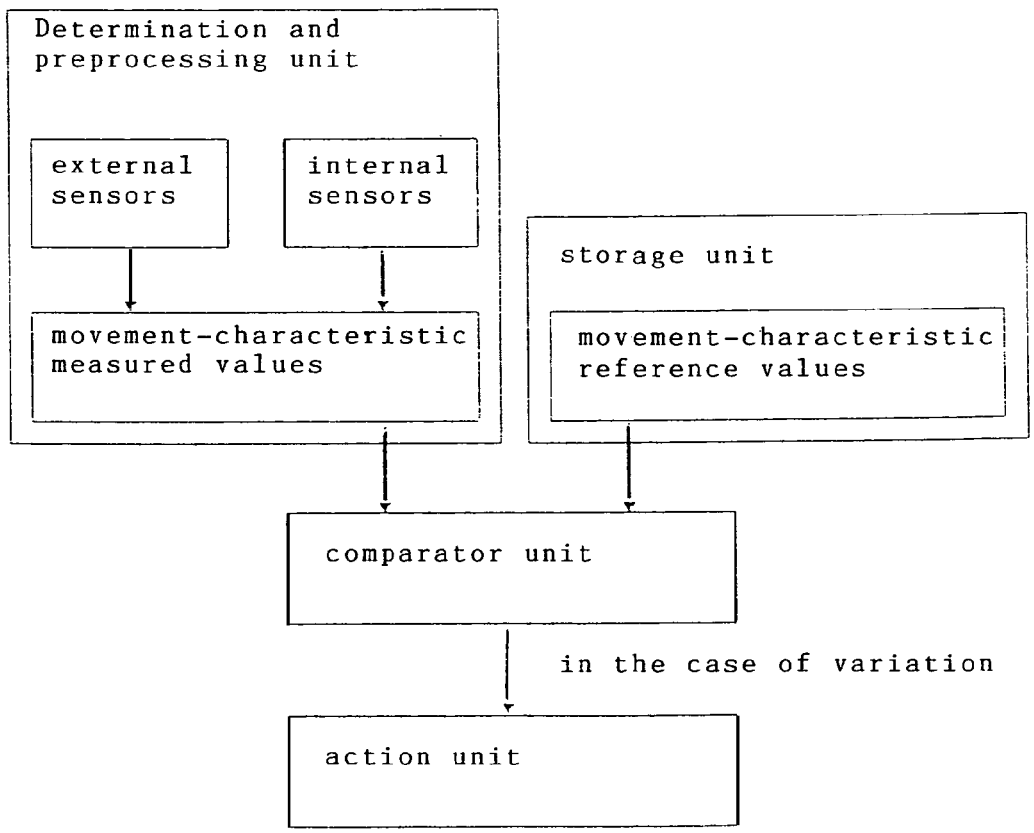
FIG. 4 A block diagram of a comparator unit.

FIG. 4 is a block diagram of a comparator unit which is used for comparing the movement-characteristic reference values with detected and preprocessed operating values. An action by the action unit is initiated, e.g. a stopping of the robot is initiated on establishing variations (e.g. by forming the difference or correlation or the method shown in FIG. 2).

The invention claimed is:

1. Method for operating a multi-axial robot, wherein at least one path section is traversed in monitored manner in a reference trip, that movement-characteristic operating values are continuously measured and stored as reference values by sensors, and that when the multi-axial robot is moving along the path during an operating rip, current movement-characteristic operating values are also determined by the sensors and compared with the stored reference values, said movement-characteristic values including one of velocity and acceleration.

2. Method according to claim 1, wherein the multi-axial robot is stopped if variations are detected between the reference and operating values.

3. Method according to claim 1, wherein the comparison between the operating and reference values is performed by forming a difference.

4. Method according to claim 1, wherein the comparison between the operating and reference values is performed by the determination of correlations.

5. Method according to claim 1, wherein the comparison between reference and operating values need not take place at certain points during program performance.

6. Method according to claim 1, wherein account is taken of tolerances when comparing the reference and operating values.

7. Method according to claim 1, wherein on starting up initially there is a move up to a reference position in space.

8. Method according to claim 7, wherein the moving up to the reference position is ensured by external sensor means monitoring the absolute position.

9. Method according to claim 1, wherein for a restarting of the multi-axial robot following a stopping thereof, the multi-axial robot is initially brought in a controlled manner onto an intended path.

10. Method according to claim 9, wherein a controlled comparison run is performed.

11. Method according to claim 10, wherein the consent key must be operated for the controlled comparison run.

12. Method according to claim 1, wherein during the reference and operating trips, on movable parts of the robot, a determination takes place of characteristic measured quantities.

13. Method according to claim 1, wherein characteristic kinetic quantities of the multi-axial robot are determined by means of position encoders, laser triangulation, laser trackers, ammeters, moment sensors, 3D image processing and/or inertial sensors arranged external to the robot.

14. A method in accordance with claim 1, wherein:
said movement-characteristic values include position values.

15. A method in accordance with claim 1, wherein:
the robot includes a plurality of mobile parts connected to each other at axes, and the robot includes a plurality of electric motors for moving the plurality of mobile parts about said axes and into different orientations;
said moving includes applying electric current to said electric motors to exert a torque on the plurality of mobile parts and move the plurality of mobile parts about said axes and into different orientations;
said movement-characteristic values include axis position, orientation, drive current and torques determined at the mobile parts of the robot during the reference trip and operating path.

16. A method in accordance with claim 1, wherein:
said sensors are external to the multi-axle robot.

17. A method for operating a multi-axial robot moving along a path, the method comprising the steps of:
moving the multi-axial robot along the path during a reference trip;
measuring movement-characteristic values of the multi-axial robot during the reference trip as reference values, said movement-characteristic values including values other than position values;
storing said reference values;
moving the multi-axial robot along the path during an operating trip;
measuring movement-characteristic values of the multi-axial robot during the operating trip as operating values, said movement-characteristic values including values other than position values;
comparing said operating values with said reference values during said moving of the multi-axial robot along the operating path trip;
stopping said moving of the multi-axial robot when said operating values deviate from said reference values for either longer than a predetermined time or greater than a predetermined amount.

18. A method in accordance with claim 17, further comprising:
providing sensors for measuring said movement-characteristic values;

performing a test movement of the multi-axial robot to a predetermined point;

measuring movement-characteristic values during said test movement as test values;

comparing said test values with said predetermined point to determine if said sensors are measuring said movement-characteristic values correctly.

19. A method in accordance with claim 17, wherein:

electric actuators are provide on the multi-axial robot for moving the multi-axial robot during the reference and operating trip;

said movement-characteristic values include a current used by the actuators during said moving.

20. A method in accordance with claim 17, wherein:

said movement-characteristic values include velocity values and acceleration values of the multi-axial robot during the reference trip and the operating trip.

21. Method for operating a multi-axial robot, wherein at least one path section is traversed in a monitored manner during a reference trip, during the reference trip one of velocity and acceleration are continuously measured and stored as reference values by sensors, and that when the multi-axial robot is moving during an operating trip, one of velocity and acceleration operating values are also determined by the sensors and compared with the stored reference values;

during the reference and operating trip, on movable parts of the multi-axial robot, a determination takes place of characteristic measured quantities.

22. A multi-axle robotic system, the system comprising:

a multi-axle robot movable along a path during a reference trip and an operating trip;

a sensor measuring movement-characteristic values of said robot during the reference trip as reference values, said sensor also measuring movement-characteristic values of said robot during the operating trip as operating values, said movement-characteristic values including values of one of velocity values and acceleration values of parts of said robot;

a storage unit storing said reference values;

a comparator unit comparing said operating values with said reference values during the operating trip.

23. A device in accordance with claim 22, wherein:

said robot includes a plurality of mobile parts connected to each other at axes, and said robot includes a plurality of electric motors for receiving electric current in order to generate torque to move the plurality of mobile parts about said axes and into different orientations;

said movement-characteristic values include axis position, orientation, drive current and torques determined at mobile parts of the multi-axial robot during the reference trip and operating trip.

24. A system in accordance with claim 22, wherein:

said movement-characteristic values include position values, said velocity values and said acceleration values;

an action unit is provided to stop movement of said robot when said operating values deviate from said reference values for either longer than a predetermined time or greater than a predetermined amount.

25. A system in accordance with claim 22, wherein:

said sensor is external to said multi-axle robot.

\* \* \* \* \*